United States Patent Office 3,177,258
Patented Apr. 6, 1965

3,177,258
HYDROGENATION PROCESS USING RUTHENIUM-CONTAINING CATALYSTS
Paul N. Rylander, Newark, and John H. Koch, Jr., Nutley, N.J., assignors to Engelhard Industries, Inc., Newark, N.J., a corporation of Delaware
No Drawing. Filed Dec. 29, 1960, Ser. No. 79,132
1 Claim. (Cl. 260—611)

This invention relates to the hydrogenation of certain organic compounds using a ruthenium-containing catalyst combined with another platinum group metal and, more specifically, the catalyst employed is a ruthenium-containing catalyst combined with platinum, palladium or rhodium.

This is a continuation-in-part application of our copending application Serial No. 10,539, filed February 24, 1960, now abandoned.

The literature relative to the hydrogenation of organic compounds contains numerous references to the use of platinum group metals as catalysts, without clearly distinguishing the relative merits thereof. Rate measurements suggest the following generalizations:

Palladium is active for the reduction of

—C≡C—, >C=C<, —C≡N, —C=N—, —N=O, and

groupings, for hydrogenolysis of activated functional groups, for preferential reduction of multiple unsaturation and selective reduction of acid chlorides.

Platinum is less selective than palladium, i.e., it will reduce the functional groups listed above, but does so more slowly and, in addition, it reduces various aromatic systems and non-activated carbonyl functions.

Rhodium is active for the reduction of a number of aromatic systems under mild conditions; activated functional groups may also undergo concomitant hydrogenolysis. Rhodium also effectivity reduces a number of functional groups, especially C=N—, and C=O.

Ruthenium is especially suited for the reduction of carbonyl compounds at low pressures and, at higher pressures, of aromatic systems where hydrogenolysis is to be avoided.

Most of the reductions listed above demonstrably involve one or more stable intermediates. For example, nitro groups can be reduced to amines through nitroso and hyroxyl amines. Phenols yield cyclohexanols by way of cyclohexanones. Oximes yield amines through readily hydrolyzable intermediates. It may be considered that the failure of certain platinum metals in the reduction of certain functional groups results from the failure of the metal to reduce a certain intermediate in a reaction sequence.

The present invention relates to a process for hydrogenating certain organic compounds, i.e., aromatic, particularly carbocyclic aromatic, heterocyclic aromatic, aromatic nitro compounds, aliphatic nitro compounds, aliphatic nitriles, aromatic nitriles, acetylenic diols, phenols, alkoxybenzenes, benzene carboxylic acids, oximes, hydroxylamines and imines, by contacting the compound to be hydrogenated with a supported catalyst containing ruthenium with another platnium group metal, particularly platinum, palladium or rhodium as catalytically active metals, at reaction temperature.

The ruthenium content of the catalyst of the invention may be, for example, elemental ruthenium or oxides thereof, such as the sesquioxide, dioxide, and tetroxide, or a suitable salt of ruthenium. Forms of ruthenium partly or completely reduced from ruthenium compounds are often preferred due to the unusual efficacy which they possess as promoting catalysts in the hydrogenation reactions of the present invention.

The ruthenium metal of the catalyst is admixed with another platinum group metal and, more particularly, platinum, palladium or rhodium, the ruthenium content of the catalyst constituting about 1 to 90 percent by weight of the catalytically active metal content of the catalyst.

The catalyst supports which may be used in the catalysts of the invention are, for example, carbon, alumina, including activated alumina, silica, including kieselguhr and synthetic gel, titanium dioxide, calicum carbonate, barium sulfate bentonite and the like. The preferred supported catalysts include a catalytically active metal content in the range of about 0.1 to 10 percent by weight of the total catalysts; a catalyst having a higher metal content can be used if desired.

Exemplary of the method employed for the preparation of catalysts used in the process of the present invention is the following, which discloses the preparation of a catalyst consisting of 3.5 percent by weight of elemental ruthenium and 1.5 percent by weight of elemental platinum supported on carbon powder.

Two precious metal solutions were prepared, one of which consisted of 60 ml. of potassium platinochloride ($K_2PtCl_4$). This solution contained 1 percent by weight of platinum, equivalent to 0.6 gram of platinum. A second solution was prepared by dissolving a quantity of ruthenium trichloride ($RuCl_3$), equivalent to 20.0 grams of elemental ruthenium, in 120 ml. of a 10 percent solution of hydrochloric acid without heating, and then diluting the solution with water to a quantity of 2 liters, the resulting solution being a 1 percent by weight solution of ruthenium; 140 ml. of this solution, to be used for preparing the catalyst, were equivalent to 1.4 grams of elemental ruthenium. 38 grams of powdered charcoal (the latter being prepared from pine wood stumps, carbonized, and activated with air at high temperature) were suspended in 200 ml. of water in a 600 ml. beaker, and stirred for a period of 0.5 hour. The solution of potassium platinochloride and the 140 ml. of the solution of ruthenium chloride were then added simultaneously, after which a 10 percent solution of sodium carbonate was added dropwise at the rate of 15 ml. at 2 drops per second, and an additional 15 ml. at 0.5 drop per second. The pH of the mixture was then read on a Beckman potentiometer as 4.80, and an additional 4 ml. of 10 percent sodium carbonate were added, raising the pH to 5.75. Superior catalysts are obtained if the pH is adjusted to the range of about 5.5 to 6.00 before heating.

The suspension was then heated above 90° C. for one hour while stirring, after which the suspension was cooled and permitted to settle. A portion of the filtered supernatant liquid had a pH of 5.35 and an $SnCl_2$ test for platinum corresponding to 3.2 percent by weight of the original quantity of platinum remaining in the filtrate. The solids were separated from the filtrate, washed, and dried at a temperature of 90° C. for a period of about 12 hours. The filtrate was clear and colorless.

The dried precipitate was broken up and a portion thereof was reduced in a hydrogen gas stream at a temperature of 400° C. for a period of 20 minutes, with nitrogen purging.

Examples of compounds capable of being hydrogenated in accordance with the present invention are the carbocyclic aromatic compounds, for instance benzene, toluene, xylene, naphthalene and anthracene; the heterocyclic aromatic compounds, for instance pyridine, pyrrole, furan and furfuryl alcohol; the aliphatic nitro compounds, for instance 1-nitropropane, 2-nitropropane, and β-nitroethylbenzene; the aromatic nitro compounds, for instance nitrobenzene, nitrotoluenes, nitrophenols and nitronaphthalenes; the aliphatic nitriles, for instance propionitrile, benzyl cyanide, acetonitrile, acrylonitrile; the aromatic nitriles, for instance phenyl cyanide, tolunitrile and naphthyl cyanide; the acetylenic diols such as butyne diols, for instance butyne-2-diol-1,4; 1,4-dimethylbutyne-2-diol-1,4; 3,6-dimethyloctyne-4-diol-3,6; and 1,4-diethylbutyne-2-diol-1,4; the phenols, for instance phenol per se, the cresols, naphthols and anthranols; the alkoxybenzenes, e.g., methoxybenzenes, methoxyphenols, ethoxybenzenes, methoxytoluenes; the aromatic carboxylic acids, for instance benzoic acid, toluic acid, ethoxybenzoic acid and naphthoic acid; the primary, secondary and tertiary amines including aniline, N-methylaniline, N,N-dimethylaniline, naphthyl amine and β-ethylphenyl amine; hydroxyl amines, for instance phenyl hydroxyl amine, naphthyl hydroxyl amine, butyl hydroxyl amine; oximes, for instance cyclohexanone oxime, salicylaldehyde oxime and 1-phenyl-1,2-propanedione-2-oxime; and imines, for instance ethylethylidene amine.

The process of the present invention includes a variety of both liquid phase and vapor phase reactions, and the preferred conditions vary somewhat depending upon the reaction involved. The reaction pressure may be in the range of about 0 to 5000 p.s.i.g., with a range of atmospheric to 700 p.s.i.g. being preferred. Atmospheric pressure is the most economical where the use thereof results in satisfactory operation.

The reaction temperature for liquid phase reactions may be in the range of about 0° C. to 250° C., and for vapor phase reactions, from about 0° C. to 350° C. For vapor phase reactions, the space velocity may be in the range of about 0.1 to 500 standard volumes of gas per volume of catalyst per hour, preferably 0.5 to 10 standard volumes per volume per hour.

For liquid phase reactions, the reaction time may be in the range of 1 minute to 2000 minutes, preferably 5 to 60 minutes, and the concentration of catalyst relative to material to be hydrogenated may be in the range of 10 to 100,000 grams of the compound to be hydrogenated per gram of catalyst, preferably 100 to 1000 grams per gram. Liquid phase reactions with ruthenium catalysts are generally more favorable when water and alcohols are employed as solvents than when anhydrous acidic solvents such as glacial acetic acid are employed. It has been found that the promoting effect on reactions using a catalyst comprising ruthenium and platinum, palladium or rhodium, is not observed in the presence of anhydrous acidic solvents.

The invention will be further illustrated by reference to the following specific examples.

EXAMPLE 1

A study was made of the hydrogenation of butyne-diol at room temperature and atmospheric pressure, using various platinum metals catalysts. The hydrogenation of butyne-diol is complex and can lead to a variety of products including butanol, butene-diol, and butane-diol.

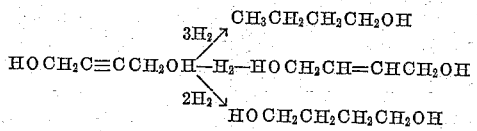

In each of these tests, 300 milligrams of a catalyst were placed in a one liter, heavy wall Erlenmeyer flask, and 100 milliliters of methanol and 200 milligrams of butyne-diol were added. The flask was placed in a shaker, capped and repeatedly evacuated and filled with hydrogen gas. The system was then connected to a gas burette and leveling bulb containing water, in order to measure hydrogen uptake. The shaker was started and the hydrogen reacted was measured on the gas burette at various intervals of time.

In Table I the rates of ml. $H_2$ absorbed/minute and number of moles of hydrogen absorbed by butyne-diol are given. The results were as follows:

Table I
HYDROGENATION OF BUTYNE-DIOL-1,4 WITH METHANOL SOLVENT

| Test No. | Catalyst | Grams catalyst | Ml. $H_2$ reacted per min. | Moles of $H_2$ reacted |
|---|---|---|---|---|
| 1 | 5% Pd/C | 0.300 | 20 | 2 |
| 2 | 3.4% Pd, 1.6% Ru/C | 0.300 | 47 | 3 |
| 3 | 2.5% Pd, 2.5% Ru/C | 0.300 | 100 | 3 |
| 4 | 4% Pd, 1% Ru/C | 0.300 | 26 | 2.5 |
| 5 | {5% Pd/C / 5% Ru/C} | 0.150 / 0.150 | 32 | 2 |
| 6 | 5% Ru/C | 0.300 | 0 | 0 |

The hydrogenations all had zero order rate curves except for tailing near the end, during which a slow absorption occurred in excess of that indicated in the table. The reaction, except for ruthenium, was in each case rapid and was substantially over in a few minutes.

It is seen from the data in Table I that partial substitution of palladium by ruthenium both increases the rate of reaction and causes the reaction to proceed further, to n-butanol instead of butane-diol. Thus, not only increased activity but a modified reaction was made possible. Just mixing 150 mg. each of 5% Pd/C and 5% Ru/C gave a more rapid reaction than 300 mg. of 5% Pd/C. On a weight of palladium basis, the mixed catalyst is much superior to palladium alone. Ruthenium alone is completely inactive.

EXAMPLE 2

In general, nitroparaffins are hydrogenated with much difficulty, compared to nitroaromatics. A study was made with the same equipment as described in Example I as to $H_2$ absorption rates with nitropropane and nitrobenzene. In each test, 300 mg. of powdered catalyst were used, the catalyst consisting of either Ru, Pt, or combinations of the two metals, each of the catalytic metals being deposited on a carbon carrier. One hundred milliliters of methanol were used as solvent and one milliliter of either nitropropane or nitrobenzene as the substrate. The following Table II gives the results of these experiments:

Table II

| Test No. | Catalyst | Milligrams of metal | Ml. $H_2$/minute | |
|---|---|---|---|---|
| | | | Nitropropane | Nitrobenzene |
| 1 | 5% Pt/C | 15 | [1] 5 | 100 |
| 2 | 5% Ru/C | 15 | 0 | 0 |
| 3 | 1% Pt, 4% Ru/C | 15 | 18 | 60 |
| 4 | 2.5% Pt, 2.5% Ru/C | 15 | 23 | 80 |
| 5 | {5% Pt/C / 5% Ru/C} | 3 / 12 | 8 | 30 |
| 6 | {5% Pt/C / 5% Ru/C} | 7.5 / 7.5 | 10 | 100 |

[1] Initial rate only; the activity steadily declined.

Nitropropane always hydrogenates more slowly than nitrobenzene and more readily poisons most catalysts. The rate of reduction of nitropropane with platinum on carbon was initially moderate, but declined as the reduction proceeded. The platinum on carbon catalyst, however, was highly active for nitrobenzene hydrogenation. The 5% Ru/C catalyst alone had essentially no activity for either reaction.

Catalysts containing ruthenium and platinum hydrogenated nitropropane at constant rate until three moles of hydrogen were absorbed. On a weight of platinum basis, these catalysts are very much more active for the hydrogenation of both nitropropane and nitrobenzene than platinum on carbon alone.

Ruthenium need not be coprecipitated with platinum to provide an improved catalyst; increased rates of hydrogenation were obtained by using a ruthenium and a platinum catalyst simultaneously; compare experiments 1 and 2 with 5 and 6. Here, too, more efficient use is made of the platinum.

Whereas ruthenium is completely inactive for the hydrogenation of the nitro group, it is, in some solvents, superior to platinum for hydrogenation of oximes. In oxime hydrogenation by ruthenium the rate increases after the reaction is about sixty percent complete, suggesting that ruthenium also has a proclivity for hydrogenation of hydroxylamines and/or imines. Ruthenium mixtures with other platinum metals furnish active catalysts for hydrogenation of oximes, hydroxylamines and imines.

EXAMPLE 3

The hydrogenation of propionitrile to amines was studied in a shaking bomb at 25° C. and 50 p.s.i.g., the rate of $H_2$ up-take being measured by the drop in pressure. For each experiment were used 300 mg. of powdered catalyst on a compound carrier, 50 ml. of hexane and 0.1 mole of propionitrile.

Results are shown in the following Table III:

*Table III*

HYDROGENATION OF PROPIONITRILE

| Catalyst | Nitrile | | 1° Amine(—NH₂) | | 2° Amine(>NH) | | 3° Amine(>N—) | |
|---|---|---|---|---|---|---|---|---|
| | Conv. | Yield | Conv. | Yield | Conv. | Yield | Conv. | Yield |
| 5% Ru/C | 0 | | 0 | 0 | 0 | 0 | 0 | 0 |
| 5% Pt/C | 32 | | 0 | 0 | 0 | 0 | 21 | 67 |
| 5% Pd/C | 93 | | 0 | 0 | 0 | 0 | 74 | 84 |
| 5% Rh/C | 100 | | 3 | 3 | 89 | 89 | 0 | 0 |
| Co-precip. metal: | | | | | | | | |
| 2.5% Ru, 2.5% Pd/C | 59 | | 0 | 0 | 0 | 0 | 41 | 70 |
| 2.5% Ru, 2.5% Pt/C | 100 | | 0 | 0 | 0 | 0 | 81 | 81 |
| Mixed metal: | | | | | | | | |
| 5% Ru/C, 5% Pd/C | 50 | | 0 | 0 | 0 | 0 | 52 | 104 |
| 5% Ru/C, 5% Pt/C | 22 | | 0 | 0 | 0 | 0 | 13 | 59 |
| 5% Ru/C, 5% Rh/C | ¹95 | | 0 | 0 | 78 | 82 | 7 | 7 |

¹ Imine is part of product.

This tabulation shows that, under the conditions, ruthenium is inactive for propionitrile hydrogenation, platinum and palladium hydrogenate in good yield to the tertiary amine, and rhodium hydrogenates in good yield to secondary amine.

If ruthenium and platinum, or ruthenium and palladium are used together (either as coprecipitated catalysts or as mixtures of catalyst powders) the conversion products are still entirely tertiary amines. In the case of ruthenium-platinum conversion, as compared to conversions with Pt/C alone, the coprecipitated ruthenium-platinum catalyst is by far the most active, giving 81 percent conversion. Pt/C alone gave 21 percent conversion, and mixed metal Pt/C and Ru/C produced only 13 percent conversion.

In the ruthenium and rhodium mixed metal test the conversion and yield of secondary amine was nearly as great as for the rhodium alone, although ruthenium alone is inactive, and only one-half as much rhodium catalyst is used as in the case using rhodium catalyst alone.

Ruthenium need not be added to the reaction mixture initially to improve the conversion. It may be noted that, although 300 mg. of 5 percent Pt gave 21 percent conversion of nitrile before catalyst inactivation, the addition of 300 mg. of 5 percent Ru increased the conversion to 48 percent.

Nitriles hydrogenate by a complicated path involving a number of intermediates. The usefulness of ruthenium in conjunction with platinum may be attributed in part at least, to its ability to hydrogenate an intermediate strongly absorbed on, but not hydrogenated by platinum.

EXAMPLE 4

The hydrogenation of pyridine in water was studied under the same conditions of pressure and temperature as used for the preceding Example 3. Pyridine was not reduced by the 5 percent Ru/C catalyst. It was reduced slowly by several palladium on carbon catalysts with rates grouping closely around 1 ml. $H_2$/minute/300 mg. of catalyst.

However, a catalyst composed of 2.5 percent ruthenium and 2.5 percent palladium on carbon reduced pyridine under these conditions at a rate of 5 ml. $H_2$/minute/300 mg. of catalyst. The effectiveness of two metals in reducing pyridine might be attributed to a step-wise hydrogenation

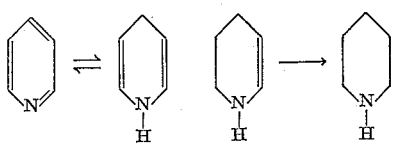

similar to that occurring in chemical reduction. Palladium is especially active for the reduction of non-aromatic double bonds, as those occurring in dihydro- or tetrahydro-pyridine; ruthenium on the other hand, will not reduce internal carbon-carbon double bonds under these conditions. Palladium does not easily reduce aromatic systems, but ruthenium has often been used for this purpose, at higher pressures.

An increased rate in the hydrogenation of pyridine is also observed when a ruthenium catalyst is used in conjunction with a palladium catalyst. When 150 mg. each of the above-mentioned palladium and ruthenium catalyst were used together the rate increased from 1 to 2.5 ml. $H_2$/minute/300 mg. of palladium catalyst.

EXAMPLE 5

The hydrogenation of toluene was examined at one atmosphere pressure and an initial temperature of 200° C. in a vapor phase flow system. Due to the strong exothermic effect of the reaction, heating occurred to a maximum catalyst temperature of 265° C.

Various catalysts on granular carbon and extruded alumina pellets as carriers were examined for this reaction. Platinum on either carrier was a highly active catalyst; however, it was rapidly poisoned by the thiophenes which are present even in Reagent Grade toluene, which is assayed to contain not more than 0.003 percent sulfur. Ruthenium catalysts alone are much less active than platinum catalysts for this reaction, being approximately as active as nickel catalysts under the conditions. It was discovered that substitution of ruthenium for about two-thirds of the platinum, produced catalysts, both on extruded alumina and granular carbon supports, which resisted poisoning to a greater degree.

Comparison toluene hydrogenations were effected in a Pyrex reactor, using 18.4 grams of catalyst in a bed one inch in diameter. A mixture consisting of 9 moles of hydrogen and 1 mole of toluene was passed over the catalyst at a pressure of 1 atmosphere and a weight hourly space velocity of 2.

About 40 ml. of reagent grade toluene was passed over the catalyst in slightly less than one hour. The product was collected in a solid carbon dioxide and methanol trap and assayed for percent methylcyclohexane—percent toluene against standards by means of refractive index. After purging the catalyst and exposing it to air, it was replaced in the reactor and used in a run of 4.5 hours under the same conditions using a more impure toluene, the same lot being used for each comparative run. Samples were collected for refractive index measurement during the beginning, middle and last half hour of the 4.5 hour period, i.e., based on the total test, 1 to 1.5 hours; 3 to 3.5 hours; and 5 to 5.5 hours. Percent conversion to methylcyclohexane is shown for each of the four test samples of specified catalysts.

The results are as follows:

Table IV
PERCENT CONVERSION TO METHYLCYCLOHEXANE

| Catalyst composition | 0 to 1 hr. | 1 to 1.5 hrs. | 3 to 3.5 hrs. | 5 to 5.5 hrs. |
|---|---|---|---|---|
| 0.6% Pt on C | 76 | 65 | 1 | 0 |
| 0.4% Ru, 0.2% Pt on C | 68 | 58 | 25 | 0 |
| 0.6% Pt on Alumina | 74 | 44 | 7 | 0 |
| 0.4% Ru, 0.2% Pt on Alumina | 59 | 55 | 30 | 15 |

It is apparent from the table that substitution of ruthenium for two-thirds of the normal platinum content increased the active life of the catalyst in this reaction.

EXAMPLE 6

Synergistic effects were determined in the hydrogenation of phenols and alkoxybenzenes. Results are given in Table V, the hydrogenation rates being shown under columns M. In each case average hydrogenation rate over the initial four hour period is given in milliliters per minute.

The catalyst and 50 ml. of water were charged to a Parr shaking apparatus, pressured to 50 p.s.i.g. with $H_2$ after flushing out the air, and shaken for one hour. Then the bottle was opened and 0.1 mol of substrate added, the flask again flushed and recharged to 50 p.s.i.g. The shaker was started and the pressure drop recorded as a function of time. When the pressure fell to 40 p.s.i.g., the flask was re-pressured to 50 p.s.i.g. The total pressure drop in 4 hours was the unit used in comparing catalyst activity. On this equipment 8 p.s.i.g. pressure charge is 0.1 mol of $H_2$.

In Table V catalysts 3 and 5 each consisted of two mechanically mixed catalysts and catalysts 6 and 7 had the two metals coprecipitated on the carbon carrier.

The significance of these data may be seen, for example, in the striking case of enhancement of anisole hydrogenation rate with catalyst 3 (a mixture of 150 mg. of 5 percent Pt/C and 150 mg. of 5 percent Ru/C and catalyst 6 (300 mg. of coprecipitated 2.5 percent Pt and 2.5 percent Ru on carbon). Catalyst 1 (5% Pt/C) hydrogenated the anisole at a rate of 0.5 ml. per minute and catalyst 2 (5 percent Ru/C) carried out the hydrogenation at a rate of 0.9 ml. per minute, whereas the aforesaid catalyst 3 hydrogenated at a rate of 7.5 ml. per minute and catalyst 6 hydrogenated at a rate of 7.0 ml. per minute. The percent of synergism is then calculated as 1000% for catalyst 3 and 900% for catalyst 6.

In the hydrogenation of phenol the rate obtained by using 150 mg. of 5 percent Pd/C and 150 mg. of 5 percent Ru/C is greater by 210 percent than the rate calculated for this mixture of catalysts assuming each acted independently. When Pd and Ru are coprecipitated the rate is 320 percent greater than that expected if the metals were to act independently.

In accordance with Table V coprecipitated Pt and Ru give large synergistic enhancements of the hydrogenation rates for all six of the substrates tested. Pd and Ru catalysts give large effects only for the hydrogenation of phenol, resorcinol and anisole.

EXAMPLE 7

Hydrogenation of 0.1 mol of benzoic acid in the presence of 50 ml. of $H_2O$ (in which it is slightly soluble) was carried out under the conditions of Example 6. Results are shown in Table VI.

Table V

SYNERGISTIC EFFECTS IN HYDROGENATION OF PHENOLS AND ALKOXYBENZENES

| Catalyst | | Mg Catalyst | Phenol | | | Resorcinol | | | Hydroquinone | | | Anisole | | | p-Dimethoxy benzene | | | p-Methoxy phenol | | |
|---|---|---|---|---|---|---|---|---|---|---|---|---|---|---|---|---|---|---|---|---|
| No. | Description | | M | C | Percent S | M | C | Percent S | M | C | Percent S | M | C | Percent S | M | C | Percent S | M | C | Percent S |
| 1 | 5% Pt/C | 300 | 4.6 | | | 4.0 | | | 3.0 | | | .5 | | | 5.0 | | | 6.2 | | |
| 2 | 5% Ru/C | 300 | 2.0 | | | 0 | | | 0 | | | .9 | | | 1.3 | | | 0 | | |
| 3 | 5% PtC / 5% Ru/C | 150 / 150 | 5.6 | 3.3 | 70 | 3.6 | 2.0 | 80 | 1.2 | 1.5 | 0 | 7.5 | .7 | 1,000 | 2.6 | 3.2 | 12 | 0 | 3.1 | |
| 4 | 5% Pd/C | 300 | 1.5 | | | .6 | | | 0 | | | 0 | | | 0 | | | 0 | | |
| 5 | 5% Pd/C / 5% Ru/C | 150 / 150 | 5.3 | 1.7 | 210 | 1.6 | .3 | 400 | 1.2 | 0 | | 1.1 | .5 | 130 | 1.2 | 1.2 | 0 | 0 | 0 | 0 |
| 6 | 2.5% Pt, 2.5% Ru/C | 300 | 12.2 | 3.3 | 370 | 4.7 | 2.0 | 135 | 6.2 | 1.5 | 320 | 7.0 | .7 | 900 | 6.0 | 3.2 | 87 | 4.7 | 3.1 | 51 |
| 7 | 2.5% Pd, 2.5% Ru/C | 300 | 7.2 | 1.7 | 320 | 0 | .3 | | 1.5 | 0 | | 3.1 | .5 | 520 | 0 | 1.2 | 0 | 0 | 0 | 0 |

M = Measured absorption in ml. $H_2$/minute.
C = Calculated absorption in ml. $H_2$/minute = ½ the sum of $M_1$ plus $M_2$ where $M_1$ is the rate for 300 mg. of one metal, $M_2$ for 300 mg. of the other.

Percent S = Percent synergism, i.e. the increase in activity over that calculated from the metals separately, $\frac{M-C}{C} \times 100$ = Percent S.

Table VI
BENZOIC ACID HYDROGENATION

| Catalyst | | Mg. Catalyst | Total ml. of H₂ adsorbed | M | C | Percent S |
|---|---|---|---|---|---|---|
| No. | Description | | | | | |
| 1 | 5% Rh | 300 | 375 | 1.6 | | |
| 2 | 5% Pt | 300 | None | | | |
| 3 | 5% Pd | 300 | None | | | |
| 4 | 5% Ru | 300 | None | | | |
| 5 | {5% Rh, 5% Pd, 5% Ru} | {300, 150, 150} | 500 | 2.1 | 1.6 | 24 |
| 6 | {5% Pd, 5% Ru} | {150, 150} | None | | | |

M, C, and percent S are defined as shown previously in Table V.

The above experimental results are held to show that, although Rh is the only one of the four Pt metals tested to hydrogenate benzoic acid under the conditions, it is possible to improve the rate of hydrogenation of benzoic acid with Rh catalysts by addition of other Pt metals including Ru. Specifically, catalyst 5 shows a 24 percent increase over the Rh activity, whereas the added catalysts 3 (Pd) and 4 (Ru) used in the experiment of catalyst 5 were inactive alone. Catalyst 6, with the same amounts of both the Pd and the Ru added in the catalyst 5 experiment was likewise inactive for the benzoic acid hydrogenation.

It will be obvious to those skilled in the art that many modifications may be made within the scope of the present invention without departing from the spirit thereof, and the invention includes all such modifications.

What is claimed is:

A process for hydrogenating a compound selected from the group consisting of phenol, resorcinol, methoxybenzene and p-dimethoxybenzene, which comprises contacting the selected compound in the presence of hydrogen with a supported catalyst consisting essentially of ruthenium and platinum at a temperature in the range of about 0° C.–350° C., the ruthenium content of the catalyst constituting about 1 percent to 90 percent by weight of the catalytically active metal content of the catalyst.

References Cited in the file of this patent
UNITED STATES PATENTS

| 2,863,929 | Lowell | Dec. 9, 1958 |
| 2,867,628 | Cass | Jan. 6, 1959 |
| 3,055,840 | Koch | Sept. 25, 1962 |

FOREIGN PATENTS

| 304,640 | Great Britain | July 19, 1929 |
| 467,681 | Canada | Aug. 29, 1950 |

OTHER REFERENCES

Hartung et al.: Jour. Am. Chem. Soc., volume 74, pages 5927–5929 (1952).